Patented Sept. 4, 1951

2,566,360

UNITED STATES PATENT OFFICE 2,566,360

AMINOALKYL ETHERS OF PYRIDYL ALKYLENE ARYL COMPOUNDS

Domenick Papa, Brooklyn, N. Y., and Nathan Sperber, Bloomfield, N. J., assignors to Schering Corporation, Bloomfield, N. J., a corporation of New Jersey No Drawing. Application August 30, 1948, Serial No. 46,923

9 Claims. (Cl. 260—294.7)

The present invention relates to a new group of compounds of interesting and important physiological action. More specifically, the invention relates to nuclear substituted amino ethers of pyridyl substituted benzenes having valuable therapeutic properties, particularly antihistaminic activity.

The compound of the present invention may be represented by the general formula

[R—X—R'] OR'' wherein R is a pyridyl, R' is a benzene ring, X is a bivalent aliphatic hydrocarbon group of 1 to 3 carbon atoms and R'' is a dialkylaminoalkyl, morpholinoalkyl, piperidinoalkyl or imidazolinyl- alkyl radical, OR'' being attached to one of the rings R and R'. The rings R and R' may be substituted by lower alkyl, lower alkoxy and halogen groups.

In general, the compounds of the present invention may be prepared by the reaction of di- alkylamino-, morpholino-, piperidino- or imid- azolinyl-alkyl halides with the appropriate pyridyl substituted benzene wherein either the benzene or pyridine ring has a hydroxyl group. For example, by reacting p-hydroxy-α-stilbazole in an inert organic solvent, such as toluene, with sodamide and β-dimethylaminoethyl chloride, there is obtained the 1-[p-(β-dimethylamino- ethoxy)phenyl]-2(α-pyridyl) ethylene. The amino ether is purified by solution in hydrochloric acid which removes neutral and acidic products and subsequent distillation of the oil obtained from the alkaline solution. In place of sodamide, sodium metal may be used as condensing agent. Other solvents such as benzene and xylene may be used in place of toluene. The following formulas illustrate the types of compounds which are within the scope of the invention:

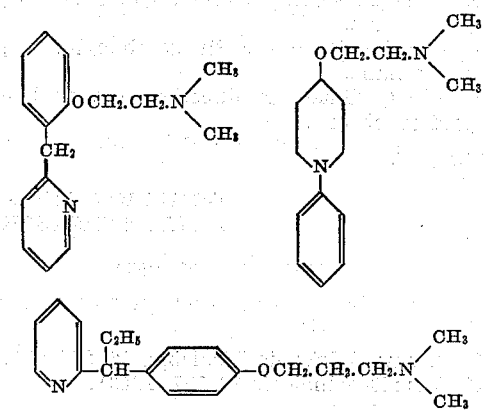

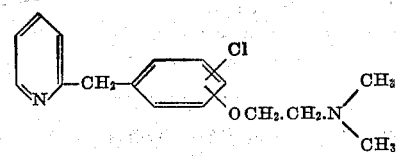

The following examples are illustrative of the principles of the invention:

EXAMPLE I

*1-[p-(β-dimethylaminoethoxy)phenyl]-2- (α-pyridyl)ethylene*

To 150 cc. of liquid ammonia, there is added 2 g. of sodium and after the sodamide has formed, the ammonia is replaced by 150 cc. of dry xylene. To the xylene suspension, there is added 11 g. of p-hydroxy-α-stilbazole. After heating the mixture for one hour on the steam bath, 15 g. of β-N,N-dimethylaminoethyl chloride is added and the reaction is heated for an additional 10-15 hours. The excess sodamide is decomposed with water, and the organic layer is separated, dried and vacuum concentrated. The amino ether is distilled, B. P. 190-195° C./1.0 mm.; M. P. 70- 71° C.

EXAMPLE II

*4-[o-(β-dimethylaminoethoxy)-β-phenethyl] pyridine*

To a suspension of sodamide (from 3 g. sodium) in 200 cc. xylene, there is added 20 g. of γ-(o-hydroxy-β-phenethyl) pyridine and after one hour of heating on the steam bath, 20 g. of β-N,N-dimethylaminoethyl chloride is added. The reaction is stirred and heated on the steam bath for an additional 10-15 hours. The excess sodamide is decomposed with water and the amino ether is isolated as described in the previous example. It distills at 160-164° C./1.0 mm.

EXAMPLE III

*p-(β-dimethylaminoethoxy)phenyl-(2- pyridyl)methane*

The intermediate, p-methoxyphenyy-(2-pyridyl)methane, is prepared as follows: Sixty-two grams of p-methoxyphenyl-(2-pyridyl) carbinol (prepared from picolinic acid and p-methoxy- benzaldehyde, J. Chem. Soc. 1939, 811) is dissolved in 2½ liters of dry benzene and cooled to 5°. To this solution with stirring there is added 50 g. of thionyl chloride, the temperature being kept below 10°. The reaction is then allowed to reach room temperature and stirring is continued for several hours. The mixture is made alkaline with dilute, ice-cold sodium hydroxide, the benzene layer is separated, dried over sodium sulfate, filtered and the solvent removed under vacuum. The residue is dissolved in 400 cc. of glacial acetic acid; and, to the stirred solution, there is added 20 g. of zinc dust. The mixture is heated on the steam bath for 7 hours. The zinc salts are filtered off, the filtrate is vacuum concentrated and the residue made alkaline with dilute sodium hydroxide. The oil which separated is ether extracted, the ether layer is dried over sodium sulfate, filtered and concentrated. The p-methoxyphenyl-(2-pyridyl) methane boils at 135–140° C./1.0 mm.

The p-hydroxyphenyl-(2-pyridyl)methane is obtained from the methoxy compound by demethylation with hydrobromic and acetic acid. It distills at 172–176° C./0.5 mm.; M. P. 129.5–130.5° C.

The amino ether is made by alkylation with β-dimethylaminoethyl chloride as described in the previous examples, B. P. 148–151° C./2 mm.

EXAMPLE IV

*o-(β-dimethylaminoethoxy)phenyl-(2 - pyridyl)-methane*

The o-hydroxyphenyl-2-pyridylmethane is prepared as described for the corresponding para compound of Example III using o-methoxybenzaldehyde. The amino ether distills at 160–164° C./1.5 mm.

EXAMPLE V

*2-[p-(β - dimethylaminoethoxy)phenyl]pyridine*

The intermediate, 2-(p-hydroxyphenyl) pyridine is prepared from 2-(p-methoxyphenyl) pyridine (Haworth, J. C. S. 359 (1940)) by demethylation with hydrobromic and acetic acids, M. P. 164–164.5° C.

The amino ether is made by alkylation with β-dimethylaminoethyl chloride as described in the previous examples, M. P. 52.5–53.5° C.

EXAMPLE VI

*2-[o-(β - dimethylaminoethoxy) phenyl]pyridine*

2-(o-hydroxyphenyl)pyridine is prepared according to the procedure in J. Org. Chem. 11, 748 (1946). The amino ether is made by alkylation with N,N-dimethylaminoethyl chloride as described in the previous examples, B. P. 165–168° C./2 mm.

EXAMPLE VII

*1-[m-(β-dimethylaminoethoxy)phenyl]-2-(α-pyridyl) ethylene*

The intermediate, m-hydroxy-α-stilbazole, is prepared according to J. Org. Chem. 10, 21 (1945), M. P. 136.8–137.2° C.

The amino ether is made by alkylation with β-N,N-dimethylaminoethyl chloride as described in the previous examples, B. P. 182–186° C./1 mm.

EXAMPLE VIII

*1-[o-(β - dimethylaminoethoxy)-phenyl] - 1-(2-pyridyl) ethane*

The intermediate, 1-(o-hydroxyphenyl)-1-(2-pyridyl)-ethane, is made by condensing picolinic acid with o-methoxyacetophenone in accordance with the procedure outlined in Example III. The 1-pyridyl-1-phenylethanol, on treatment with thionyl chloride and subsequent reduction with zinc dust, yields the 1-(o-methoxyphenyl)-1-(2-pyridyl) ethane. Demethylation with hydrobromic acid yields the hydroxy compound which is converted into the ether as described in the previous examples.

EXAMPLE IX

*1-[o - (β-dimethylaminoethoxy)-phenyl] - 1-(2-pyridyl) propane*

The requisite intermediate is obtained by alkylating the o-hydroxyphenyl-(2-pyridyl) methane of Example IV with ethyl bromide and sodamide in accordance with known methods. It is advantageous to use the methoxy compound in the alkylation in order to avoid the use of two molar equivalents of sodamide as would be required with the free phenol. The methoxy compound is then demethylated and the alkamine ether made as described in the previous examples.

EXAMPLE X

*p-[β-(4-piperidino)ethoxy]phenyl-(2 - pyridyl)-methane*

The (p-hydroxy phenyl)-(2-pyridyl) methane described in Example III is alkylated with β-(4-piperidino)ethyl chloride in accordance with the directions of the previous example. The compound so obtained is purified by solution in acid and subsequent distillation of the oil obtained from the acid solution after treatment with gaseous ammonia.

The compounds of the invention may be used as such or in the form of their salts with inorganic and organic acids, particularly the hydrohalide salts, such as the hydrochloride.

We claim:

1. Compounds of the group consisting of bases of the general formula

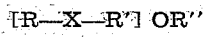
[R—X—R'] OR'' wherein R is a pyridyl ring, R' is a benzene ring, X is a bivalent aliphatic hydrocarbon group of 1 to 3 carbon atoms, R'' is selected from the group consisting of dialkylaminoalkyl and piperidinoalkyl radicals, and OR'' is attached to one of the rings R and R', and the acid salts thereof.

2. Compounds of the general formula

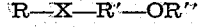
R—X—R'—OR'' wherein R is a pyridine ring, R' is a benzene ring, X is a bivalent aliphatic hydrocarbon group of 1 to 3 carbon atoms, and R'' is a dialkylaminoalkyl group.

3. Compounds as defined in claim 2 wherein X is —$CH_2$—.

4. Compounds as defined in claim 2 wherein X is —$CH_2 \cdot CH_2$—.

5. 4-[o-(β-dimethylaminoethoxy) - β - phenethyl]pyridine.

6. p-(β-dimethylaminoethoxy)phenyl-(2 - pyridyl) methane.

7. o-(β-dimethylaminoethoxy)phenyl-(2 - pyridyl) methane.

8. 1-[o-(β-dimethylaminoethoxy)-phenyl] - 1-(2-pyridyl) ethane.

9. p - [β -(4 - piperidino) ethoxy]phenyl-(2-pyridyl) methane.

DOMENICK PAPA.
NATHAN SPERBER.

REFERENCES CITED

The following references are of record in the file of this patent:

Hartman: California Medicine, 66, 246 (1947).
Huttrer: Enzymologia 12, 327 (1948).